United States Patent [19]
Farmer

[11] 3,855,476
[45] Dec. 17, 1974

[54] FILM TRANSFER DEVICE
[75] Inventor: Robert B. Farmer, Boulder, Colo.
[73] Assignee: Katum Corporation, Boulder, Colo.
[22] Filed: Apr. 13, 1973
[21] Appl. No.: 350,891

[52] U.S. Cl. ............................... 250/470, 250/468
[51] Int. Cl. .......................................... G01n 23/00
[58] Field of Search .................... 250/468, 469, 470

[56] References Cited
UNITED STATES PATENTS

| | | | |
|---|---|---|---|
| 1,059,488 | 4/1913 | Rosenthal | 250/470 |
| 2,349,427 | 5/1944 | Heimerich | 250/470 |
| 2,795,702 | 6/1957 | Morris | 250/470 |
| 3,448,979 | 6/1969 | Farmer | 271/33 |
| 3,541,940 | 10/1970 | Bartnick et al. | 250/468 |
| 3,553,453 | 1/1971 | Hogan | 250/468 |
| 3,569,700 | 3/1971 | Quinn | 250/469 |

Primary Examiner—Archie R. Borchelt
Assistant Examiner—B. C. Anderson
Attorney, Agent, or Firm—Burton, Crandell & Polumbus

[57] ABSTRACT

A film transfer unit for transferring exposed x-ray film sheets from the vertically adjustable exposure unit of a chest x-ray machine to a stationary film processing unit. A light tight vertically elongate film receiving housing is mounted upon an automatic film processing unit with the lower end of the housing opening into the film receiving slot of the processing unit. The film receiving housing extends upwardly from the processing unit along the vertical path of travel of the film discharging slot of the vertically movable exposure unit. A vertically elongate slot in the housing faces and encompasses the film discharging slot of the exposure unit throughout its range of vertical movement. A bank of flexible opaque material spans the vertically elongate slot above and below the exposure unit and is slidably guided along its opposite edges by sliding light seals extending along the opposite sides of the vertically elongate slot. The exposure unit is likewise slidably coupled to the film receiving housing by a sliding light seal. A blower unit mounted at the upper end of the housing provides an air flow urging the film sheets downwardly into the receiving slot of the processing unit, and likewise prevents fumes from the processing unit from passing though the housing into the exposure unit. A sliding shutter automatically closes to seal the receiving slot when the blower is not in operation. A film receiving magazine is provided to receive film from the transfer device in the event the processor is out of operation.

9 Claims, 16 Drawing Figures

Fig_1

Fig_3
Fig_2

FILM TRANSFER DEVICE

BACKGROUND OF THE INVENTION

A typical chest x-ray machine in present day use includes an exposure unit mounted on the machine frame for vertical adjustment so that the unit may be adjusted to the height of the chest of the person being x-rayed. Film for machines of this type is usually in the form of individual sheets which are loaded into packs into the machine from a light tight magazine. The film sheets are fed, one at a time, into alignment with the exposure station, exposed and then fed to a receiving magazine. When the receiving magazine is filled, it is removed from the exposure unit and transferred to a processing unit which then develops the exposed films. Because, in many situations, large numbers of x-rays are taken in a relatively short period of time, as for example in a tuberculosis program, automatic processing units have been developed in which the exposed films are fed one at a time into the processing unit which then automatically conveys the film through a series of processing stations and discharges a developed film.

The present invention is directed to a film transfer unit in which the film sheets are transferred individually after exposure directly from the exposure unit into the processing unit so that each individual film may be promptly processed and inspected.

SUMMARY OF THE INVENTION

A film transfer unit according to the present invention includes a vertically elongate housing which is adapted to be mounted upon an automatic film processing unit with the lower end of the housing enclosing the film receiving slot of the processing unit. This housing, in effect, forms a film handling chute through which the film sheets can drop into the receiving slot of the processing unit. The film sheets are inserted into the interior of the housing through a vertically elongate slot in the housing which is located to face and encompass the vertical path of travel of the film discharge slot on the film exposure unit. Vertical flanges along opposite sides of the vertically elongate slot in the housing slidably engage complementary flange formations on the exposure unit to form a sliding light tight seal along opposite vertical sides of the film discharge slot on the exposure unit. To provide a horizontal light tight seal above and below the discharge slot of the exposure unit, an elongate band of opaque material horizontally spans the slot in the housing above and below the exposure unit. One end of the span is secured and light sealed to the exposure unit above its discharge slot and extends upwardly along the vertically elongate slot in the housing and then passes through the housing over a series of guide rolls to the bottom of the vertically elongate slot in the housing and then upwardly along the elongate slot to the lower side of the discharge slot of the exposure unit. The edges of the band are slidably light sealed along the vertically elongate slot in the housing, and thus, the exposure unit and band move upwardly and downwardly together along the vertically elongate slot while maintaining a light sealed opening between the film discharge slot in the exposure unit and the interior of the housing.

A blower unit is mounted to discharge a flow of air downwardly through the housing to assist in floating discharged film downwardly into the film receiving slot of the processing unit and to also prevent the escape of fumes from the processing unit into the housing and thence to the exposure unit. A sliding shutter automatically closes the receiving slot when the blower is not in operation.

When the processor is shut down, as for periodic cleaning or maintenance, a film receiving magazine may be mounted on the transfer unit. The transfer unit, when uncoupled from the processor may be attached to the exposure unit to enable the exposure unit to elevate and support the transfer unit clear of the processor.

Other objects and features of the invention will become apparent by reference to the following specification and to the drawings.

Referring first to FIGS. 1-4, there is shown a chest x-ray machine which includes a main cabinet designated generally 20 upon which an exposure unit designated generally 22 is mounted and counterbalanced for vertical movement in a well-known manner. A film transfer unit 24 embodying the present invention is employed to transfer exposed x-ray film sheets from exposure unit 22 into a stationary film processing unit 26. With the exception of the film transfer device 24, all of the units shown in FIGS. 1-4 are commercially available units of known construction.

Figure 1:
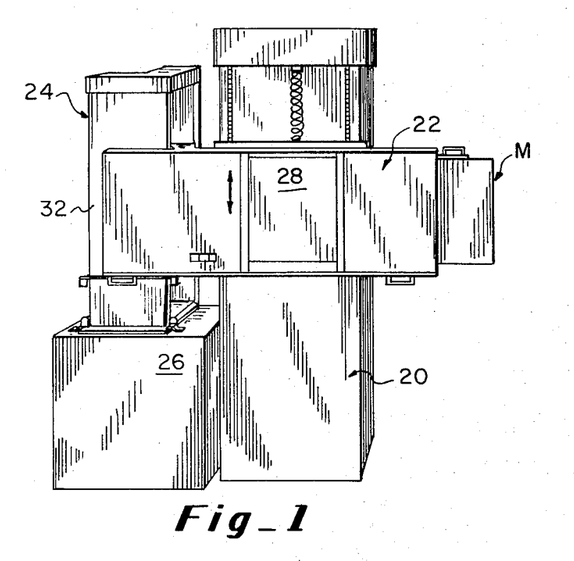
FIG. 1 is a front perspective view of a chest x-ray exposure unit and processing unit employing a film transfer device according to the present invention.
Figures 2, 3:
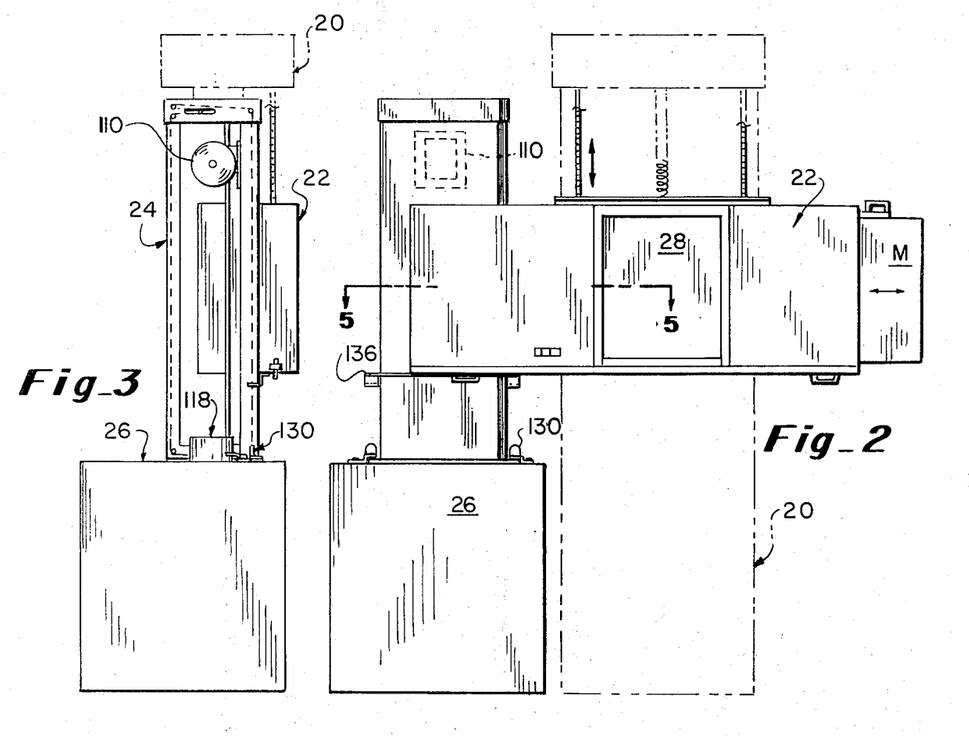
FIG. 2 is a front elevational view of the assembly of FIG. 1.
FIG. 3 is a side elevational view of the assembly of FIG. 1.

In brief, a pack of unexposed x-ray film sheets are loaded into the right hand side of exposure unit 22 by means of a magazine M, FIG. 1. Unexposed film sheets are fed, one by one, from a storage space at the right hand side of exposure unit 22 as viewed in FIG. 1 into alignment with an exposure station 28, at which the film sheets are exposed. After exposure, the sheet is fed to the left as viewed in FIG. 1, clear of exposure station 28 to a film discharge slot to be described in greater detail below. Feeding of the film sheets in the foregoing manner may be accomplished by mechanism such as that shown in my U.S. Pat. No. 3,448,979. The discharged film sheets pass into the transfer unit of the present invention, which will be described in greater detail below, and drop downwardly through the transfer mechanism into processing unit 26 which automatically processes and develops the exposed sheets.

Figure 6:
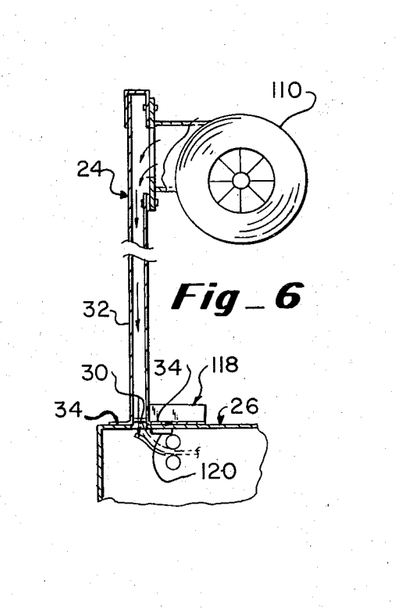
FIG. 6 is a cross-sectional view taken on line 6—6 of FIG. 4.

Referring briefly to FIG. 6, processing unit 26 is provided with a film receiving slot 30 in its upper surface through which exposed film passes into the interior of the processing unit. The exposed film is automatically passed by the processing unit through various developing baths and the developed film is discharged from the unit through a discharge opening, not shown. The transfer unit 24 of the present invention is mounted on the upper surface of processing unit 26 and includes a vertically elongate housing 32 whose inner length and width correspond in general to the length and width of the film receiving slot 30 of processing unit 26. Horizontal outwardly projecting flanges, such as 34, at the lower end of housing 32 enable the housing to be fixedly clamped by a clamping assembly described below, upon processing unit 26 to form a light tight enclosure extending vertically upwardly from film receiving slot 30.

Figure 4:
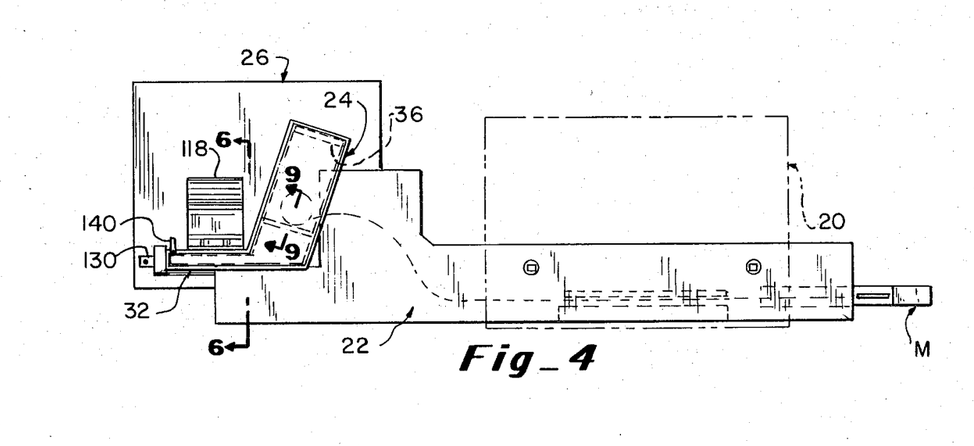
FIG. 4 is a top plan view of the assembly of FIG. 1.
Figure 5:
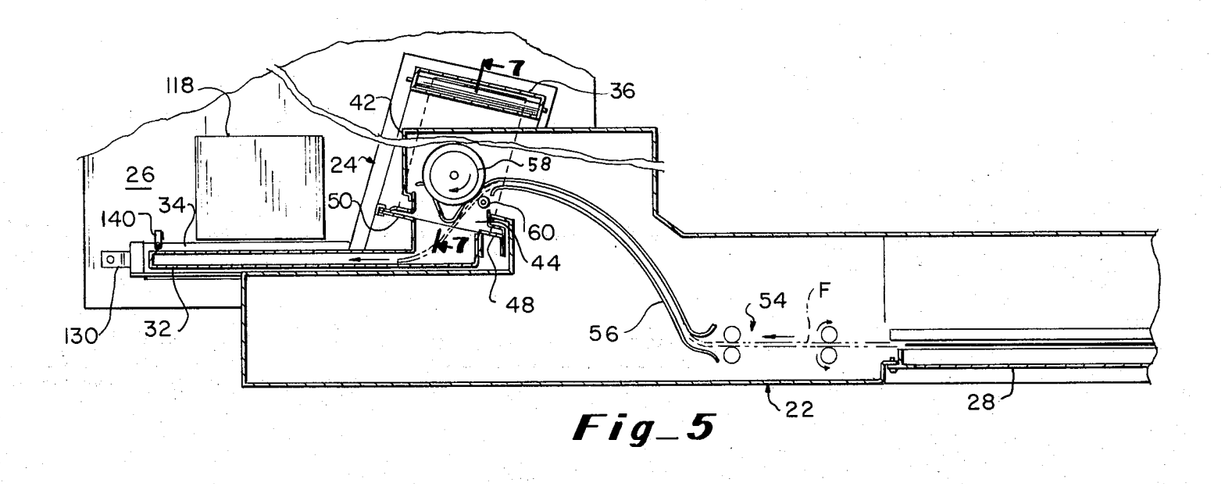
FIG. 5 is a cross-sectional view taken approximately on line 5—5 of FIG. 2.
Figures 7, 8, 9:
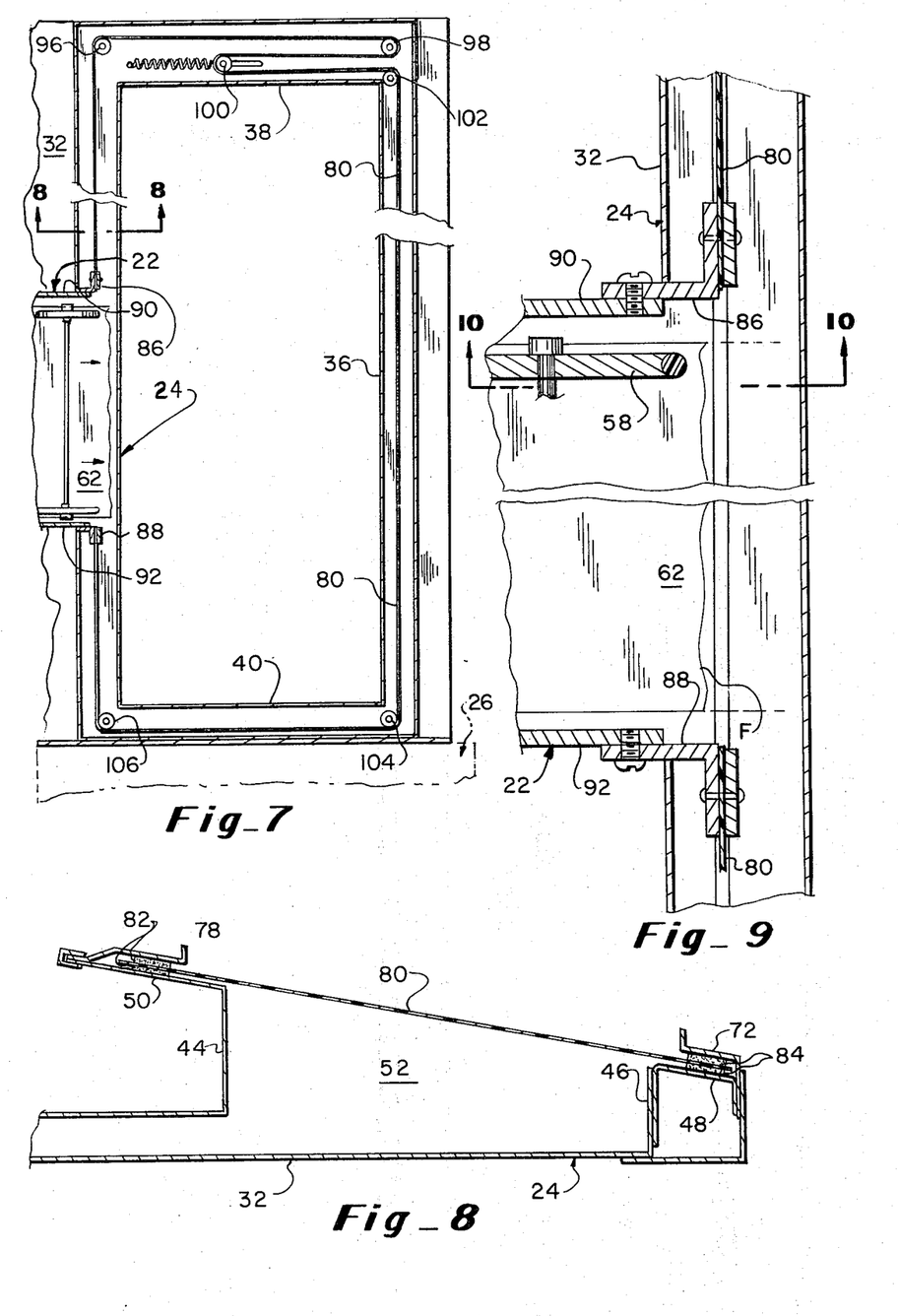
FIG. 7 is a cross-sectional view taken on line 7—7 of FIG. 5.
FIG. 8 is a cross-sectional view taken on line 8—8 of FIG. 7.
FIG. 9 is a cross-sectional view taken on line 9—9 of FIG. 4.

Referring now particularly to FIGS. 4, 5 and 7, it is seen that in addition to the vertically extending first housing section 32, the transfer device includes a second elongate vertically extending housing section 36 which is horizontally spaced and somewhat angularly offset from housing section 32. As best seen in the cross-sectional view of FIG. 7, the interior of housing sections 32 and 36 are connected to each other at their upper and lower ends by upper and lower passage sections 38 and 40 respectively. As best seen in FIG. 7, the vertically extending first and second housing sections 32 and 36, combined with the horizontally extending upper 38 and lower 40 passage sections define a vertically elongate rectangular opening within which a projecting portion 42 (FIG. 5) of exposure unit 22 can move as the exposure unit is adjusted vertically upon its main cabinet 20. Comparing FIG. 5 with FIG. 8, it is seen that the opposite sides of the rectangular clearance opening just referred to are parallel with each other, the first housing section 32 being formed with outwardly projecting walls 44 and 46 terminating in oppositely directed flange sections 48 and 50 respectively, these latter flanges lying in a common plane generally parallel to the opposed wall of second housing section 36. The spacing between outwardly projecting wall portions 44 and 46 defines a vertically elongate slot or opening 52 in that "wall" of first housing section 32 defined by flanges 48 and 50. It is through this vertically elongate slot 52, which extends vertically from the upper end of lower passage section 40 to the lower end of upper passage section 38, through which film sheets are fed from exposure unit 22 into the interior of first housing section 32.

Referring now to FIG. 5, a portion of the mechanism for feeding the film sheets F is indicated generally at 54 in FIG. 5. As viewed in FIG. 5, the film sheets are fed from right to left along a path partially defined by a guide channel 56 and eventually pass between a relatively large feed roll 58 and a relatively smaller feed roll 60 from which the film sheet F passes through a film discharge slot 62 which is essentially a relatively wide slot in exposure unit 22 located between flanges 64 and 66 (see FIG. 10).

Figures 10, 11:
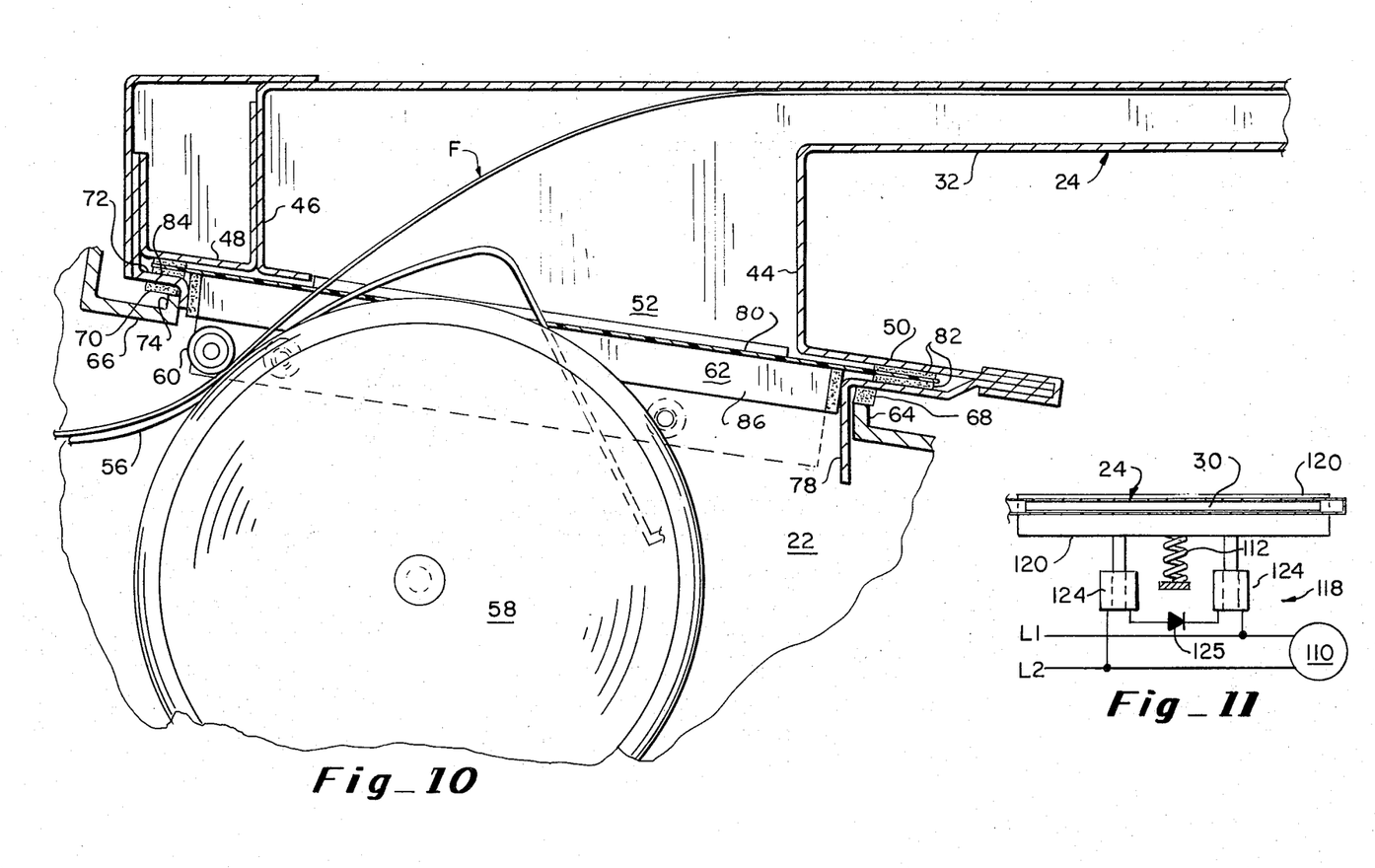
FIG. 10 is a cross-sectional view taken on line 10—10 of FIG. 9.
FIG. 11 is a top plan view of the receiving slot shutter mechanism with its cover removed.

Referring more particularly now to FIG. 10, it is seen that a sliding light seal is formed between flanges 64 and 66 of exposure unit 22 and structure mounted on flanges 48 and 50 of transfer unit 24. The light seals referred to include a strip of a deep pile velvet-like material fixedly mounted upon auxiliary flanges on transfer unit 24 as at 68 and 70. At the left hand side of the discharge opening 62 as viewed in FIG. 10 a light seal strip 70 is mounted upon a flange member 72 fixedly secured to and supported in space parallel relation to flange 48 slightly outwardly of flange 48. The strip 70 is mounted on the outer side of flange 72 in a fixed position, the projecting portion 74 of flange 66 pressing against and sliding along strip 70 as the exposure unit 22 moves vertically relative to the stationary transfer unit 24. Similarly, at the right hand side of opening 62 as viewed in FIG. 10 an outwardly projecting L-shaped flange 78 carries a second strip of light seal material 68 which is slidably engaged by the projecting toe of flange 64 on exposure unit 22.

The two light seals just described provide a seal along the vertical sides of film discharge slot 62 which is maintained throughout the full range of vertical travel of the exposure unit relative to the transfer unit.

To provide a light seal across the horizontal upper and lower sides of the generally rectangular discharge opening 62, transfer unit 24 carries a band of light opaque material designated 80. Band 80, as best seen in FIG. 8, horizontally spans the vertically elongate film receiving slot 52 of the transfer unit, the opposite side edges of band 80 being slidably received between light seal strips 82–84 mounted between the opposed flanges 78–50 and 72–48. As best seen in FIGS. 8 and 9, the opposite ends of band 80 are secured by a light tight connection, such as 86 and 88 to the upper and lower surfaces 90 and 92 of exposure unit 22 to thus extend across the upper and lower ends of film discharge slot 62. As best seen in FIG. 7, band 80, from its connection at upper surface 90 of exposure unit 22 extends upwardly through first hrusing section 32 and passes around a guide roller 96 rotatably mounted in the housing and thence horizontally across upper passage section 38. Band 80 then passes round a guide roller 98 at the upper end of second housing section 36 then passes around a tensioning roll 100 and then to a second guide roll 102 in housing 36, thence downwardly through housing section 36 around additional guide rollers 104 and 106 and thence up to connection 88 to lower exposure unit surface 92. Referring to FIG. 8, it is believed apparent that upon vertical movement of exposure unit 22 from the position shown in FIG. 7, band 80 will similarly move, maintaining a light seal around the film discharge opening 62 regardless of the vertical position of this opening relative to the transfer unit.

From the foregoing, it is believed apparent that the feeding mechanism employed within exposure unit 22 may be employed to feed the individual film sheets F from the exposure station into the interior of housing 32, from which the film can drop downwardly through housing 32 and film receiving slot 30 into film processing unit 26, within which the film is developed. Further details of the feeding mechanism are found in my U.S. Pat. No. 3,448,979. To assist the sheets in dropping into film receiving opening 30 of processing unit 26, a blower 110 may be mounted at the upper end of housing section 32 to discharge a flow of air through housing 32 downward to the processor 26. This downwardly directed air flow assist in moving the sheets downwardly through the housing section, the sheets sometimes having a tendency to cling to the walls of the housing. The downwardly directed flow of air further serves the purpose of preventing fumes from the chemical developing processes performed in processing unit 26 from rising upwardly through housing 32.

To prevent fumes from the processor from escaping upwardly into the interior of housing 32 when the processor is not in operation and to further prevent this occurrence in the event of a power failure to blower 110, a shutter assembly designated generally 118 is mounted upon the top of processor 26 at one side of housing 32. In FIG. 11 there is shown a plan view of the shutter assembly with its cover removed in which it is seen that the assembly includes a sliding shutter 120 which is normally biased into sealed overlying relationship with slot 30 of processor 26 by a spring 122. Shutter 120 may be drawn clear of slot 30 by energization of a pair of solenoids 124, the solenoids when energized retracting shutter 120 against the action of spring 122. As schematically illustrated in FIG. 11, solenoids 124 are electrically connected in parallel with blower motor 110 across blower motor supply lines L1 and L2 so that solenoids 124 are energized only when blower motor 110 is in operation. A diode 125 is installed in series with the solenoids 124 to rectify the AC voltage thereby reducing the noise level of the solenoids. In the event that the power supply to blower 110 is interrupted either intentionally when shutting off the machine or because of a power failure, solenoids 124 are de-energized and shutter 120 is automatically shifted to its sealing position by the action of spring 122.

For purposes of normal maintenance or repair, it is frequently desired to disconnect processor 26 from transfer unit 24 and, in order to enable the processor to be moved clear of the remainder of the machine while disconnected, to support transfer unit from exposure unit 22 upon removal of the processor.

Figure 12:
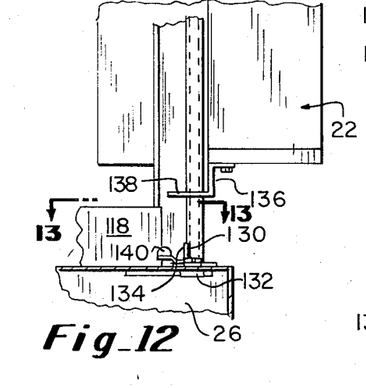
FIG. 12 is a detail side elevation of the lower end of the transfer chute showing the coupling mechanisms.
Figure 13:
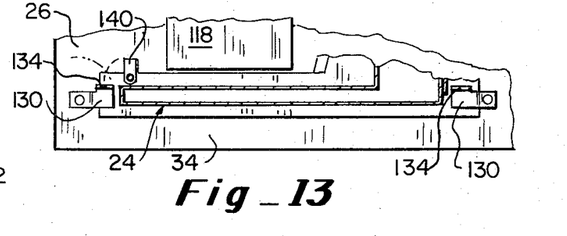
FIG. 13 is a section taken on the line 13—13 of FIG. 12.
Figure 14:
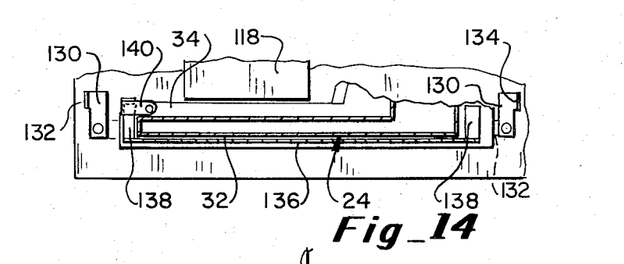
FIG. 14 is a section similar to FIG. 13, but showing the transfer chute disconnected from the processor and coupled to the exposure unit.

During normal operation of the machine, transfer unit 24 is sealingly clamped in position upon the top of processor 26 by a pair of pivoted clamping arms 130 mounted on brackets 132 on the processor for pivotal movement between the positions shown in FIGS. 13 and 14 respectively. In FIG. 13, clamping arms 130 are shown in the position in which transfer unit 24 is clamped upon processor 26, clamping arms 130 in this position overlying portions of flange 34 on transfer unit 24. Clamping arms 130 are formed with an integral upwardly projecting web 134. Webs 134 serve a dual function in that they provide a convenient surface for grasping to manually shift arms 130 between their two positions and, in addition, function as a limit stop limiting lowering movement of exposure unit 22 when transfer unit 24 is mounted upon processor 26. Referring particularly to FIGS. 12 and 14, it will be noted that an angle member 136 is fixedly secured to the lower surface of exposure unit 22 and is formed at opposite ends with horizontally projecting coupling webs 138. When transfer unit 24 is clamped in position upon processor 26 with clamping arms 130 in the position shown in FIGS. 12 and 13, coupling webs 138 are vertically aligned with upwardly projecting webs 134 on clamping arms 130 and will engage webs 134 to limit downward movement of exposure unit 22.

When clamping arms 130 are moved to the unclamped position shown in FIG. 14, the upwardly projecting webs 134 are moved clear of the path of coupling webs 138, as seen in FIG. 14, and the exposure unit may then be lowered until coupling webs 138 rest upon the upper surface of flange 34 of transfer unit 24. When webs 138 rest upon flange 34, a second pair of clamping arms 140 pivotally mounted on flange 34 may be swung into overlying relationship with coupling webs 138 to thus clamp transfer unit 24 to exposure unit 22. Elevating exposure unit 22 will then lift transfer unit 24 clear of processor 26 so that the processor may be removed for maintenance or repair. The latch arrangement described above prevents the possibility of inadvertently latching transfer unit 24 to exposure unit 22 while transfer unit 24 is still latched to processor 26.

In the event of a breakdown of the processor, a film receiving magazine designated generally 150 (FIGS. 15 and 16) is provided to collect film while the processor is out of operation. Film collected in magazine 150 may be taken to a darkroom to be developed in a conventional manner until processor 26 is back in operation.

Figure 15:
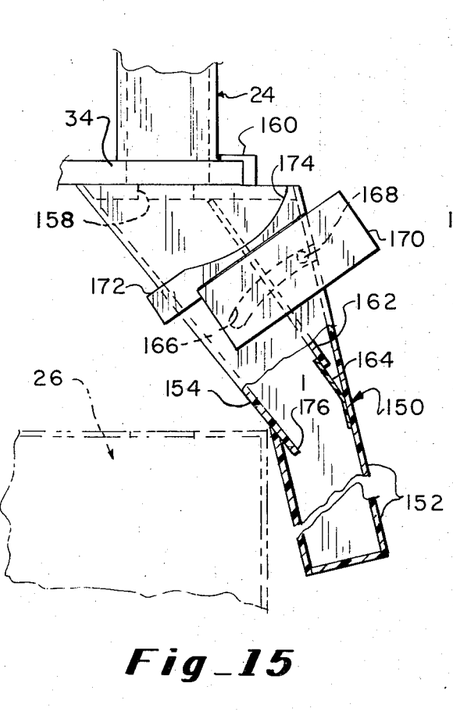
FIG. 15 is a detail side view, partially broken away, showing a film magazine coupled to the transfer chute.
Figure 16:
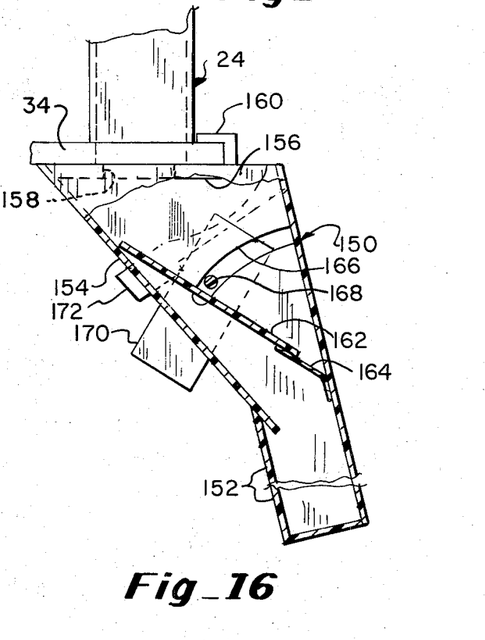
FIG. 16 is a vertical cross-section through the magazine of FIG. 15.

As best seen in FIGS. 15 and 16, magazine 150 takes the form of a vertically elongated box 152 having an inclined wall 154 at its upper end to provide an enlargement at the top of the box. The upper wall 156 of box 152 is formed with an opening 158 (FIG. 16) through which film passes from transfer unit 24 into the interior of the box. An elevated mounting lip 160 secured to the outer side of the top wall of the box is arranged to fit over flange 34 of tranfer unit 24 to mount the magazine upon the lower end of the transfer unit when it is uncoupled from processor 26. It will be noted that magazine 150, when viewed from the side as in FIGS. 15 and 16, is inclined downwardly and forwardly. This inclination not only provides a fair amount of clearance between magazine 150 and processor 26 as seen in FIG. 15, but also places the center of gravity of the magazine somewhat horizontally to the right of mounting lip 160 so that the magazine is gravitationally biased in a clockwise direction as viewed in FIGS. 15 and 16 about mounting lip 160 to urge its upper wall 156 into engagement with the lower surface of flange 34. As best seen in FIG. 16, a light trap in the form of a panel 162 is mounted in the interior of magazine 150 as by a plastic hinge 164 on the inner side of the front wall of the magazine. A spring 166 normally biases the light trap to its closed position shown in FIG. 16 in which the panel 162 extends entirely across the interior of magazine 150 to provide a light seal preventing light from reaching the lower, film carrying, portion of the magazine by blocking this lower portion from light passing through opening 158 and arcuate slots 156 in the side wall of the magazine. A transversely extending rod 168 is secured to the upper or forward side of panel 162 and projects outwardly through slots 166 in the side walls of the magazine. Light blocking panels 170 are carried on the outer ends of rod 168 in slideable light sealed engagement with the outer side surfaces of the magazine.

When magazine 150 is mounted in its film receiving position on transfer unit 24 as shown in FIG. 15, panel 162 is swung to a position clear of the forward side of slot 158 so that film dropping through the slot can pass to the lower end of the magazine. Panel 162 is moved to this position by shifting panels 170 to the FIG. 15 position and latching the panels in the FIG. 16 position by a latch 172 of a plastic material having a flexible mounting arm 174 fixed to magazine 150. As best seen in FIG. 15, inlined wall 154 is projected downwardly beyond its intersection with the lower end of box 152 to form a projecting shielding lip 176. As the film slides downwardly into magazine 176, when the upper edge of the film passes below lip 176, the entire film by virtue of the inclination of magazine 152 falls toward the lefthand side of the magazine as viewed in FIGS. 15 and 16 so that its upper edge is shielded beneath the lip. Thus the next following film sheet can slide freely downwardly to the magazine without having its lower edge interfered with by the upper edge of the previously inserted films.

While one embodiment of the invention has been described in detail, it will be apparent to those skilled in the art that the disclosed embodiment may be modified. Therefore, the foregoing description is to be considered exemplary rather than limiting and the true scope of the invention is that defined in the following claims:

I claim:

1. For use in combination with an x-ray unit having a vertically adjustable film exposure unit operable to discharge an exposed film from a film discharge slot at one side thereof throughout the entire range of vertically adjustable movement of the exposure unit, and a stationary film processing unit having an upwardly opening film receiving slot, a film transfer unit for transferring exposed film from the discharge slot of said exposure unit to the receiving slot of said processing unit comprising a vertically elongate housing having an opening at its lower end adapted to overlie said receiving slot, mounting means at the lower end of said housing for mounting said housing upon said processing unit with said film receiving slot encompassed by said opening, said housing having a vertically elongate slot in one side thereof extending along the entire range of movement of said discharge slot of said vertically adjustable exposure unit when said housing is mounted upon said processing unit, first light seal means on the exterior of said housing extending along opposite sides of said vertically elongate slot slidably engageable with said exposure unit on opposite sides of said discharge slot, second light seal means on the interior of said housing extending along opposite sides of said vertically elongate slot, an upper and a lower curtain section spanning said vertically elongate slot and slidably engaged along their opposite side edges by said second light seal means, and third light seal means for securing the lower end of said upper curtain section to said exposure unit above said discharge slot and for receiving the upper end of said lower curtain section to said exposure unit below said discharge slot, said third light seal means extending transversely across said first light seal means to slidably engage said first light seal means at opposite sides of said vertically elongate slot.

2. The invention as defined in claim 1 wherein said upper and said lower curtain sections are opposite ends of an elongate band of flexible opaque material, and guide rolls mounted in said housing supporting said band for movement therein upon vertical movement of said exposure unit relative to said housing.

3. The invention defined in claim 1 wherein said housing includes a first section having vertical side walls and end walls defining a vertically extending film receiving chamber having a length and a width substantially equal to those of said film receiving slot and a height at least equal to the range of vertical movement of said exposure unit plus the height of said film discharge slot.

4. The invention defined in claim 3 wherein said housing includes a second vertically extending section of a height equal to that of said first section, said second section being angularly offset from said first section in horizontally spaced relationship thereto, upper and lower passage sections interconnecting the upper and lower ends of said first and second sections to each other and placing the interior of the first and second sections of said housing in light tight communication with each other, said first section having an angularly offset portion at one end thereof in opposed parallel relationship to said second section, said elongate slot extending vertically along said offset portions, and a band of opaque flexible material movably mounted in and extending through said second section of said housing and said upper and lower passage section, said upper and lower curtain sections being constituted by the opposite ends of said band.

5. Apparatus as defined in claim 1 further comprising blower means mounted in the upper end of said housing for inducing a flow of air downwardly through said housing and outwardly through said opening at the lower end of said housing.

6. An x-ray unit comprising a vertically adjustable film exposure unit having a film discharge slot for discharging an exposed film, a stationary film processing unit for developing exposed film and having a film receiving slot, a box-like film transfer means mounted upon said processing unit and coupled to said exposure unit for transferring exposed film from said discharge slot to said receiving slot, said transfer means having a vertically elongate slot in one side thereof in which said exposure unit is free to slide in a vertical direction and light sealing means in said transfer means to prevent the ingress of light regardless of the position of the exposure unit relative to the transfer means, blower means operable to induce a flow of air from said transfer means into said receiving slot, and shutter means for closing said receiving slot when said blower means is inoperative.

7. The invention defined in claim 6 wherein said shutter means comprises a shutter plate slidably mounted upon said processor for movement between an open position retracted clear of one side of said receiving slot and a closed position overlying and closing said receiving slot, spring means biasing said shutter plate to said closed position, and retracting means operable upon operation of said blower means for retracting said plate to said open position.

8. A chest x-ray unit comprising a vertically adjustable exposure unit having a film discharge slot for discharging an exposed film, a film transfer unit light sealed to said exposure unit around said discharge slot for receiving film therefrom, a stationary film processor for developing said film and having a film receiving slot, mounting means detachably coupling said transfer unit to said processor in light sealed relationship thereto around said receiving slot, said mounting means comprising a pair of hold down members pivotally mounted on said processor in adjacent spaced relationship to said receiving slot, flange means on said transfer unit adapted to engage said processor in face to face engagement around said slot between said hold down means, said hold down means being moveable to locking position overlying said flange means to clamp said flange means to said processor, upwardly projecting, lugs on said hold down means, abutment means on said exposure unit engageable with said lugs on said hold down means when said hold down means are in said locking position to prevent lowering of said exposure unit below a predetermined distance above said flange means, and pivotal coupling means pivotally mounted on said flange means engageable with said abutment means when said hold down means are in their release position to complete said transfer unit to said exposure unit for movement therewith.

9. For use in combination with a film transfer unit having a film discharge slot at its lower end and an outwardly projecting horizontal flange along its lower forward edge; a film receiving magazine comprising a film receiving box having a rearwardly and upwardly inclined rear wall at its upper end, a top wall having a film receiving slot therethrough, a mounting lip on said top wall adapted to overlie said flange to support said magazine upon the lower end of said transfer unit with said film receiving slot vertically aligned with said film discharge slot said box being inclined downwardly and forwardly from said top wall, said rear wall having an extension thereon continuing into the interior of said box in a downwardly and forwardly inclined direction to form an overhanging shielding lip in the interior of the box adapted to vertically overlie the upper edges of films deposited in said box a light trap panel hingedly mounted on the interior of the forward wall of said magazine for movement between a light blocking position in engagement with said rear wall above said shielding lip and a film receiving position adjacent said front wall forwardly of said receiving slot, spring means biasing said panel to said blocking position, and latch means for holding said panel in said receiving position.

* * * * *